United States Patent
Ondrasik

[11] Patent Number: 6,098,998
[45] Date of Patent: Aug. 8, 2000

[54] SHOPPING CART WITH CHILD SEAT

[76] Inventor: V. John Ondrasik, 6150 Sheila St., Los Angeles, Calif. 90040-2407

[21] Appl. No.: 09/112,467
[22] Filed: Jul. 9, 1998
[51] Int. Cl.$^7$ ..................................................... B62B 11/00
[52] U.S. Cl. ............................... 280/33.993; 280/DIG. 4; 280/47.4
[58] Field of Search ........................... 280/33.993, 47.35, 280/33.991, 79.3, DIG. 4, 47.38, 47.4; 220/331

[56] References Cited

U.S. PATENT DOCUMENTS

| | | | |
|---|---|---|---|
| D. 171,935 | 4/1954 | Dodds | 280/33.993 |
| 2,443,236 | 6/1948 | Gallagher | 280/33.993 |
| 2,662,661 | 12/1953 | Goldman | 280/33.881 X |
| 3,042,032 | 7/1962 | Vogel | 280/33.993 X |
| 3,297,108 | 1/1967 | Davis | 280/33.995 |
| 3,375,018 | 3/1968 | Close | 280/33.991 |
| 3,497,234 | 2/1970 | Schray | 280/33.993 |
| 3,645,554 | 2/1972 | Von Stein et al. | 280/33.991 |
| 3,751,059 | 8/1973 | Dunder et al. | 280/DIG. 4 |
| 4,046,394 | 9/1977 | Thompson, Jr. | 280/DIG. 4 |
| 4,084,832 | 4/1978 | Upshaw | 280/33.997 |
| 4,381,870 | 5/1983 | Muellner | 280/33.993 |
| 4,403,807 | 9/1983 | Wilkinson et al. | 297/188.1 |
| 4,560,180 | 12/1985 | Ulmer | 280/33.993 |
| 4,805,935 | 2/1989 | Grayson | 280/33.992 |
| 5,149,114 | 9/1992 | Lewandowski et al. | 280/33.997 |
| 5,356,161 | 10/1994 | Pokhis | 280/33.991 |
| 5,918,891 | 7/1999 | Russell | 280/33.991 |
| 5,961,133 | 10/1999 | Perry | 280/33.993 |

FOREIGN PATENT DOCUMENTS

| | | | |
|---|---|---|---|
| 004203330 | 8/1993 | Germany | 280/33.003 |
| 43 37 917 A1 | 5/1994 | Germany . | |

*Primary Examiner*—J. J. Swann
*Assistant Examiner*—F. Zeender
*Attorney, Agent, or Firm*—Brown, Martin, Haller & McClain, LLP

[57] ABSTRACT

A shopping cart has a wheeled base, a frame projecting upwardly from the base, and a basket having a rear end secured to the frame and projecting forwardly from the frame. The basket has a front wall with a pair of leg openings, and a back support member is adjustably mounted in the basket for movement between a first position against the inside of the front wall to close the leg openings, and a second position spaced rearwardly from the front wall to provide a back support for a child seated in the front end of the cart with the child's legs extending through the leg openings.

12 Claims, 2 Drawing Sheets

SHOPPING CART WITH CHILD SEAT

BACKGROUND OF THE INVENTION

The present invention relates generally to shopping carts and is particularly concerned with a child seat arrangement for a shopping cart.

Existing shopping carts generally have a child seat in the rear wall of the cart. A gate is pivoted to the basket such that it may be pivoted between a position in which it is flat against the rear wall of the cart, and a position in which it is inclined away from the rear wall, with a horizontal seat portion extending between the gate and rear wall to form a seat for a child, with the child's legs extending through leg openings in the rear wall. One problem with this arrangement is that it increases the number of moving parts in the cart, and thus the noise or rattling when the cart is moved, as well as the risk of parts jamming together when carts are nested, for example. Also, a rearwardly facing child seat may not be ideal, since the child faces the person pushing the cart and cannot see what is going on around them very well.

SUMMARY OF THE INVENTION

It is an object of the present invention to provide a new and improved shopping cart with a child seat.

According to the present invention, a shopping cart is provided which comprises a wheeled base, a frame projecting upwardly from the base, and a basket having a rear end secured to the frame and projecting forwardly from the frame, the basket having a front wall, the front wall of the basket having a pair of leg openings, and a back support member movable between a first position against the inside of the front wall to close the leg openings, and a second position spaced rearwardly from the front wall to provide a back support for a child seated in the front end of the cart with the child's legs extending through the leg openings.

Preferably, a locking or securing mechanism is provided for releasably securing the back support member in the first and second positions. The base of the cart projects forwardly beyond the front wall of the cart to provide a buffer to protect the child's legs from impact if the cart should be accidentally pushed against any shelves or other objects in a store.

In a preferred embodiment of the invention, the base of the cart is inclined downwardly towards the forward end of the base, to permit cart bases to be nested together. This vertical taper differs from the horizontal taper or inwardly tapering sides of conventional cart bases, and permits the base to be of a more rectangular shape while still permitting carts to be readily nested together.

The shopping cart of this invention allows a child to be readily seated in the forward end of the fixed basket, without limiting the child's view of the surroundings. This also reduces the number of moving parts needed in the rear end of the basket, since all that is required is a pivoting rear end wall to permit nesting, and the gate and seat base can be eliminated. Also, the child is positioned closer to the ground than in a conventional child seat as provided in current shopping carts.

BRIEF DESCRIPTION OF THE DRAWINGS

The present invention will be better understood from the following detailed description of a preferred embodiment of the invention, taken in conjunction with the accompanying drawings in which like reference numerals refer to parts and in which.

DESCRIPTION OF THE PREFERRED EMBODIMENT

Figure 1:
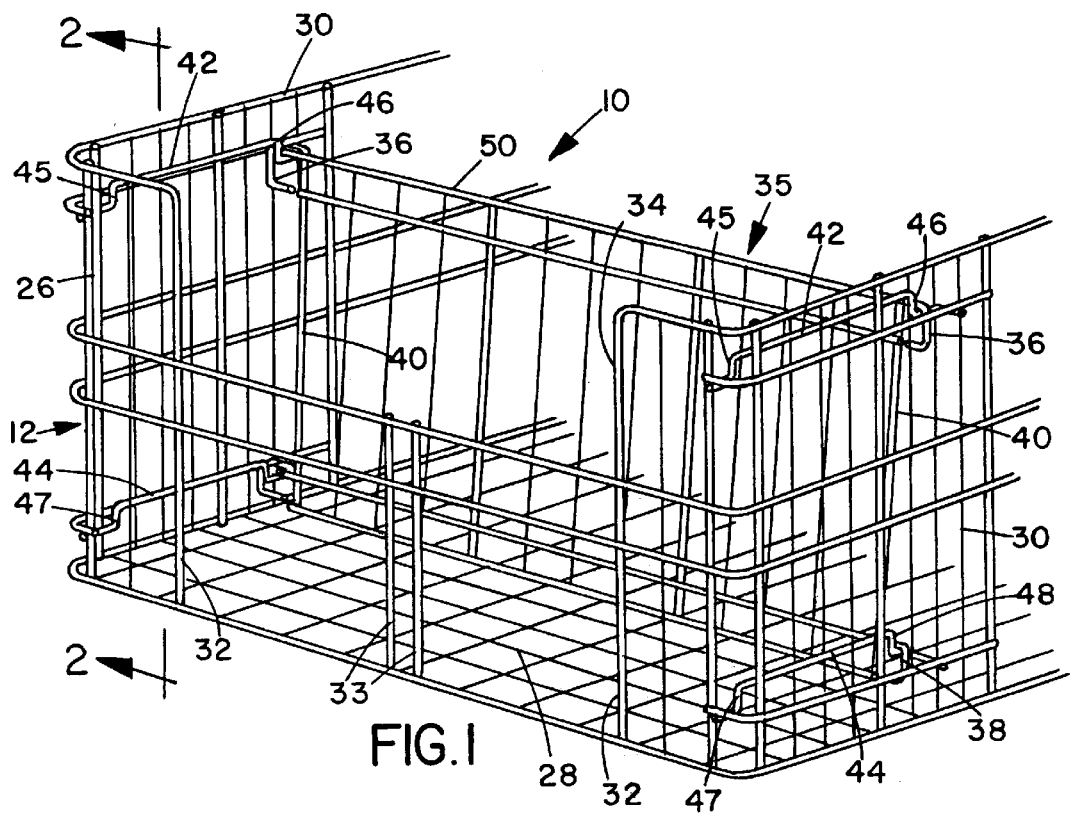
FIG. 1 is a perspective view of the front end of a cart incorporating a forward facing child seat according to a preferred embodiment of the invention.
Figure 2:
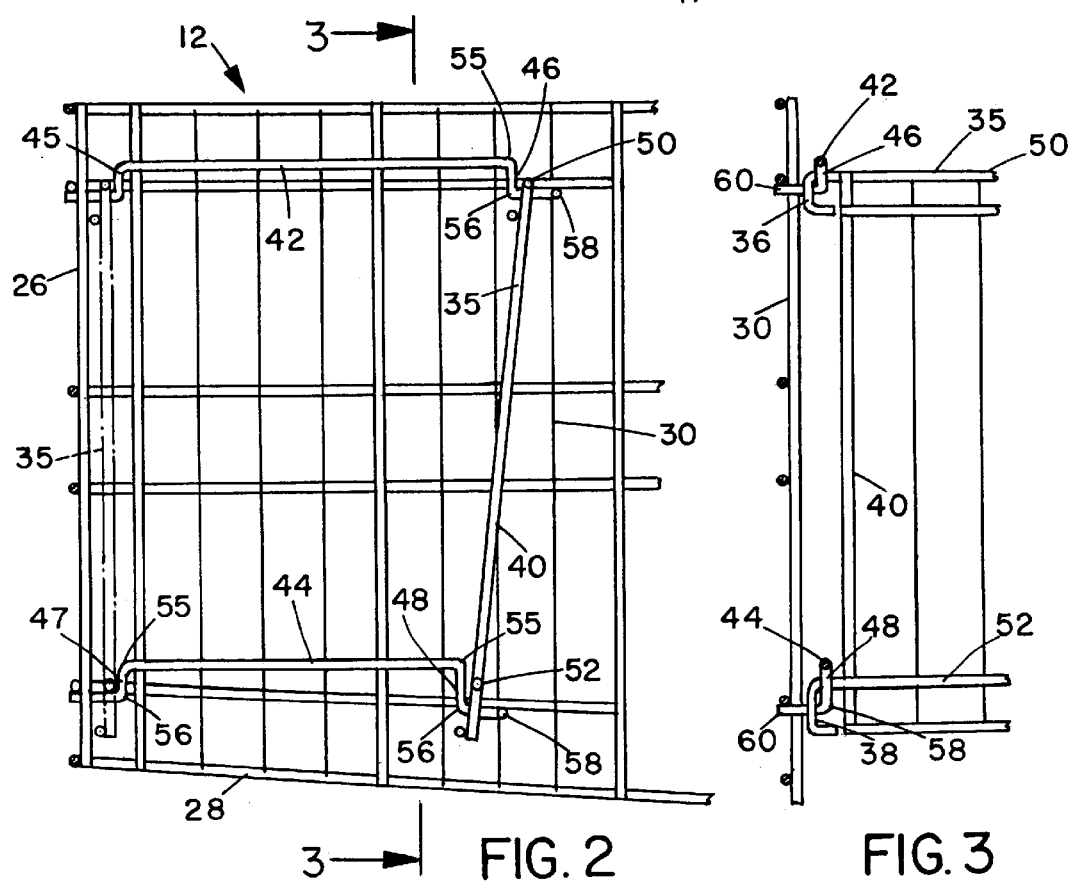
FIG. 2 is an enlarged sectional view taken on line 2—2 of FIG. 1.
Figure 3:
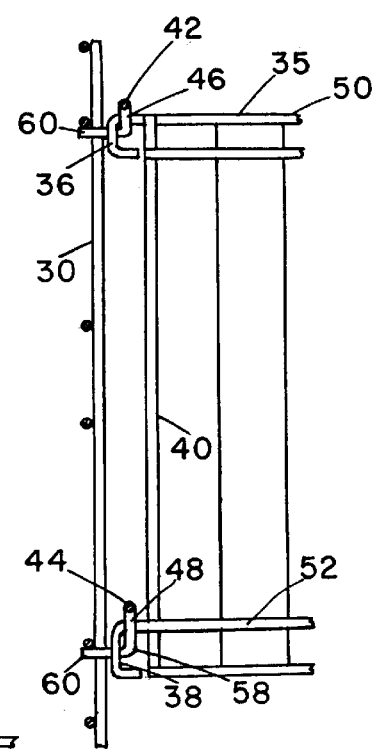
FIG. 3 is a sectional view taken on line 3—3 of FIG. 2.
Figure 4:
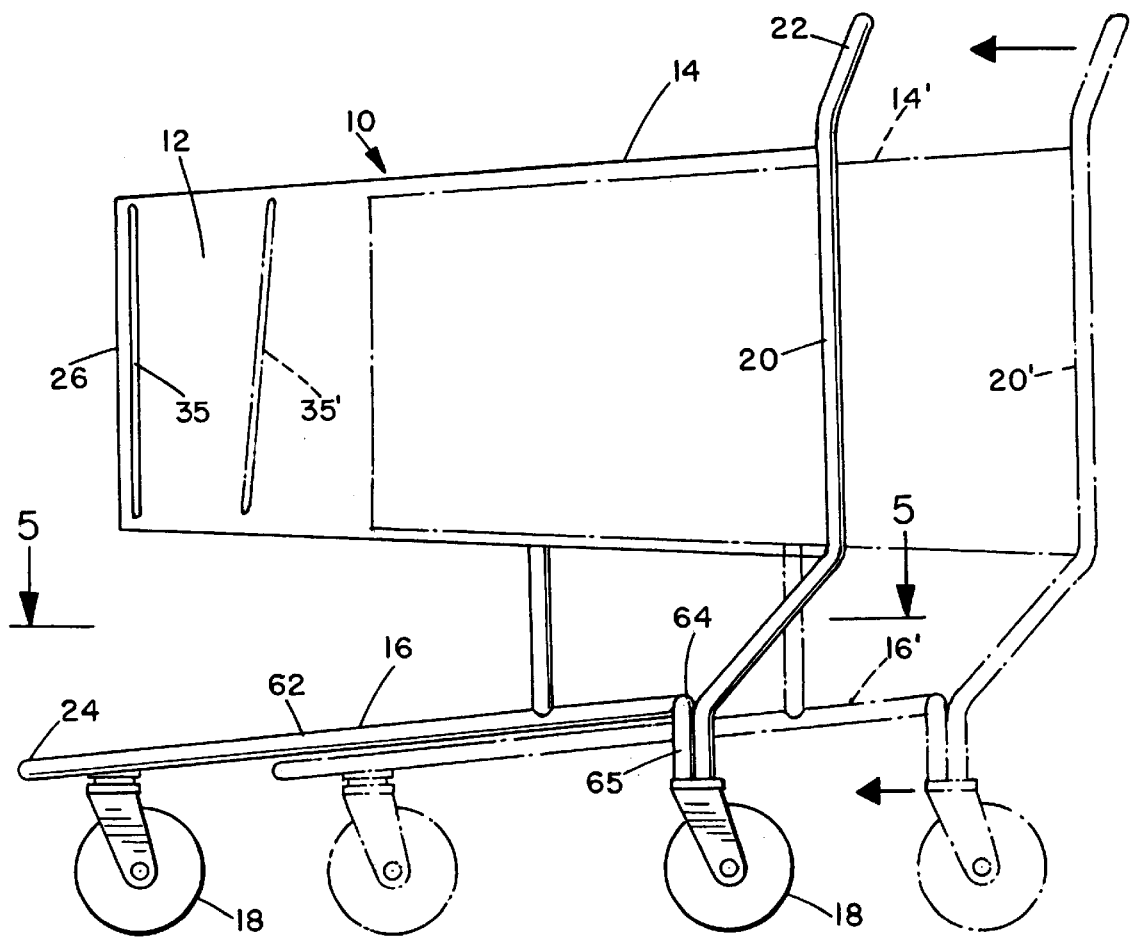
FIG. 4 is a side view of a shopping cart configuration with the child seat, a second cart being indicated in broken line partially nested.
Figure 5:
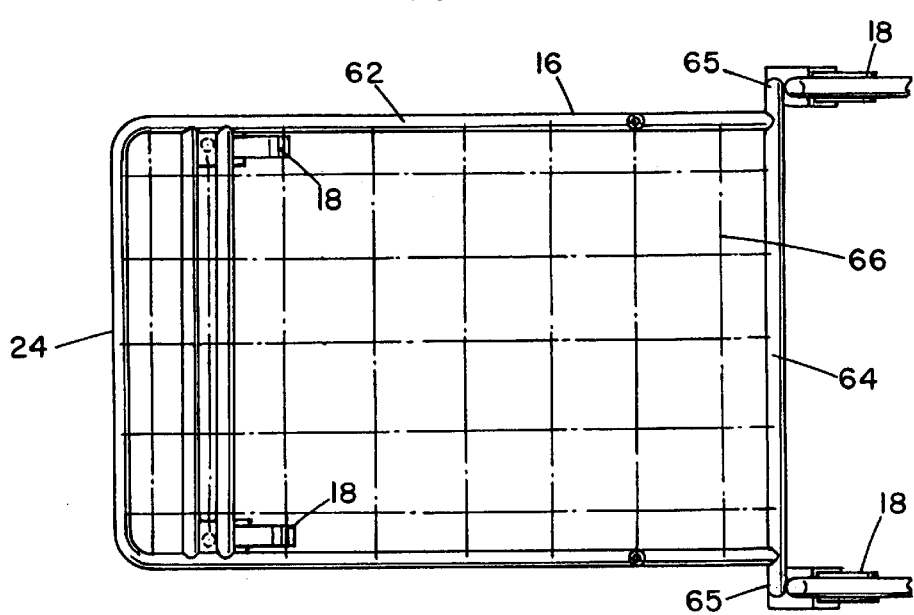
FIG. 5 is a sectional view taken on line 5—5 of FIG. 4.

FIGS. 1 to 3 illustrate the forward end of a shopping cart basket 10 which has been modified to provide a convertible, forward facing child seat 12. Preferably, the basket 10 is mounted on a shopping cart 14 as illustrated in FIGS. 4 and 5. The cart 14 has a base 16 with wheels 18, and an upwardly extending frame 20 at the rear end with a handle 22 at its upper end. Basket 10 has a rear end secured to frame 20 so as to project forwardly over the base. However, the forward end 24 of the base projects outwardly beyond the forward end wall 26 of the basket.

As best illustrated in FIGS. 1 to 3, the basket also has a lower wall 28 and spaced side walls 30, all of wire grille construction. Leg openings 32 separated by upright rods 33 are provided in the front end wall 26. The leg openings 32 are designed to receive the legs of a child seated at the forward end of the basket in a forward facing position. The upper portion of the front wall above the leg openings 32 also has a recess or opening 34 to form an arm rest for the child and allow the child to see clearly out of the front of the cart.

A movable back rest panel or seat partition 35 is adjustably mounted in the basket for movement between a first position spaced rearwardly from the front wall as illustrated in FIGS. 1 and 2, and a second position adjacent the front wall to close the leg openings 32 and opening 34, as illustrated in FIG. 4 and in dotted outline in FIG. 2. The back rest panel 35 is also of wire grille construction, and has hooked upper and lower end portions 36, 38, respectively, projecting from each side 40 of panel 35. The upper hooked end portions 36 engage over an upper slide rod or track 42 secured to the inside of each side wall 30 so as to extend generally horizontally up to the front wall 26. Similarly, the lower hooked end portions 38 engage over a lower slide rod or track 44 secured to each side wall, as illustrated in FIGS. 1 to 3.

The upper slide rods 42 have downwardly indented forward and rear end stops 45, 46 to define end positions for the upper hooked portions 36, while the lower slide rods 44 also have downwardly indented forward and rear end stops 47, 48 which define the end positions of the lower hooked portions 38. The upper slide rods 42 are longer than the lower slide rods 44, as best illustrated in FIG. 2.

As best illustrated in FIG. 3, the back rest panel 35 has an upper transverse rod 50 and a lower transverse rod 52. Each of the rods is extended to project beyond the opposite sides 40 of the panel, and is then bent downwardly to form the respective hooked end portions 36, 38 which are hooked over the slide rods 42 and 44, respectively. When the back rest panel 35 is in the first position illustrated in solid line in FIGS. 1 and 2, the upper hooked end portions 36 are engaged over the rear end stops 46 of the upper slide rods 42, while the lower hooked end portions are engaged over the rear end stops 48 of the lower slide rods 44. The back rest panel is therefore held securely in a rearwardly inclined orientation as illustrated, forming a comfortable back rest for a forwardly facing child seated in the resultant child seat 12.

The forward and rear end stop in each rod 42, 44 is formed by a downward, right angle first bend 55, and a second bend 56, respectively. The free forward end of the respective rod is then suitably welded to the forward end of the respective side wall 30. The rear end of each rod has a third bend 58 about an axis perpendicular to the first two bends so as to direct a portion 60 of the respective rod outwardly, with the free end of the respective rod welded to the respective side wall as indicated in FIG. 3. Rear end portions 60 act as stops so that the panel 35 cannot be pushed rearwardly from the position illustrated in FIGS. 1 and 2, preventing further rearward movement of the panel and forming a secure back rest if a child leans back against panel 35.

If a user does not need a child seat, and instead wishes to use the entire basket enclosure for items to be purchased, the panel is simply pulled up so that the upper and lower transverse rods 50, 52 clear the respective rear end stops 46, 48, and the panel can then slide forwardly with the hooked portions sliding along the slide rods 42 and 44 until the forward end stops 45 and 47 are reached. The panel can then be dropped down so that the hooked portions 36 and 38 fall down into the respective end stops 45 and 47, into the position illustrated in dotted outline in FIG. 2. In this position, the panel 35 is held securely against the inside face of the front wall 26, closing the leg openings 32 and upper recessed region 34 to prevent items from falling out of the basket. The procedure is reversed to move from the second position of FIG. 4 back to the first position of FIG. 1, again lifting the panel until rods 50, 52 are spaced above the horizontal portions of rods 42, 44, respectively, and then sliding the panel rearwardly until the hooked portions can drop down in to the recessed end stop regions 46, 48.

Thus, the front end portion of the cart may be readily converted between a forward facing child seat and a conventional continuation of the remainder of the basket, simply by sliding panel 35 back and forth between its two end positions.

The shopping cart 14 preferably also has a modified base configuration for more readily nesting with other carts, such as a second cart 14' as indicated in dotted outline in FIG. 4. In conventional shopping cart bases, the periphery of the base comprises a rod or bar of generally U-shaped configuration with sides which taper outwardly from the front to the rear end of the base. A wire grille tray is pivotally secured to the peripheral rod at the front end of the base, and is pivoted upwardly when another cart is nested in from the rear. This has disadvantages since it increases the number of moving parts required, increasing noise and rattling when pushing the cart, and also increasing the risk of carts becoming jammed together when nested.

In the modified cart configuration of FIGS. 4 and 5, the base 16 is downwardly inclined from the rear end to the front end 24 of the cart, and comprises a generally rectangular, U-shaped peripheral rod 62 as illustrated in FIG. 5, with a transverse rod 64 secured across the ends of the U-shaped rod at the rear end of the base. Rod 64 has end portions 65 projecting outwardly beyond the opposite sides of the base and the rear wheels 18 are secured to the end portions 65. The wire tray 66 may be permanently or rigidly secured to rod 62 to extend over the base, with a suitable raised barrier at the forward end. Alternatively, it may be pivotally mounted such that it lies flat during use and is pushed up as a cart nests in from the rear. When two carts are nested together, the basket 10' of the rear cart 14' will push into the rear of basket 10 of the front cart via a pivoting rear wall or gate in a conventional manner. The rear wheels 18 are spaced apart by a distance greater than the width of the base 16', so that it can nest in between wheels 18 and under the upwardly tapered base of the forward cart 10. Thus, the downwardly inclined base 16' of the rear cart will simply nest under the inclined base 16 of the forward cart, as indicated in FIG. 4, where the two carts are partially nested together.

A forward facing child seat 12 at the front end of a shopping cart has advantages over conventional rearwardly facing child seats as currently provided in such carts. Firstly, the seat 12 is more readily deployed, simply by sliding panel 35 into the position illustrated in FIGS. 1 and 2, and is less liable to become jammed or stuck than a conventional seat which forms part of a pivoting rear gate which is repeatedly raised when carts are nested together for storage. The arrangement of this invention completely separates the child seat from the pivoting rear gate of the cart for permitting nesting. Secondly, the child can view the surroundings more easily in a forward facing position, and will be less likely to become bored. Since the forward end 24 of the base projects out beyond the forward end of the basket 10 by an amount sufficient to extend beyond the legs of a child seated in the cart, there is little risk of the child's legs being injured, since the front end 24 of the base will hit any obstacles before the child's legs are struck. Finally, the child is positioned closer to the ground than in a conventional shopping cart child seat.

Although the illustrated embodiment has a child seat in the forward end of the basket with the cart pushed from the rear, the cart may alternatively be modified such that it is pushed from end 26. In this case, the shopper will be adjacent the child, as in a conventional cart. However, the seat will still have advantages over a conventional cart seat, since it is easier to deploy and closer to the ground. In this alternative, the swivel wheels of the cart will be moved to the rear end as viewed in FIG. 4, and a handle will be provided at the front end 26 of the basket.

Although a preferred embodiment of the invention has been described above by way of example only, it will be understood by those skilled in the field that modifications may be made to the disclosed embodiment without departing from the scope of the invention, which is defined by the appended claims.

I claim:

1. A shopping cart, comprising:

a wheeled base having a front end and a rear end;

a frame projecting upwardly from the rear end of the base and having a handle for pushing the cart;

a basket having a rear end secured to the frame and projecting forwardly from the frame above the base;

the basket having a front wall, spaced side walls and a lower wall, the front wall of the basket having a pair of leg openings;

a back support panel slidably mounted in the basket for movement between a first position against the inside of the front wall to close the leg openings, and a second position spaced rearwardly from the front wall to provide a back rest for a child seated in the front end of the cart with the child's legs extending through the leg openings; and the back support panel lying against the front wall in said first position with substantially no gap between the panel and front wall, and being at a predetermined spacing from the front wall in said second position, whereby, in said second position, the lower wall between the back support panel and front wall, and the back support panel together form a seat for supporting a child.

2. The cart as claimed in claim 1, wherein the base has a forward end projecting beyond the front wall of the basket for a predetermined distance.

3. The cart as claimed in claim 1, wherein the front wall has an open region above the leg openings for providing an arm rest.

4. The cart as claimed in claim 1, wherein the back support panel is inclined rearwardly in said second position.

5. The cart as claimed in claim 1, including at least one horizontally extending slide rod extending along an inner side of each side wall in a direction transverse to the front wall from the front wall to the second position, each slide rod being spaced inwardly from the inner side of the respective side wall, the back support panel extending transversely across the width of the basket and having opposite sides, and at least one hook portion projecting from each side of the panel for sliding engagement over a respective slide rod in the adjacent side wall of the basket, whereby each hook portion is slidable along substantially the entire length of the respective slide rod from the front wall to the second position to move the panel between said first and second positions.

6. The cart as claimed in claim 5, wherein an upper and a lower slide rod is secured to the inner side of each side wall, and an upper and a lower hook portion projects from each side of the panel for sliding engagement over the upper and lower slide rod, respectively, in the respective adjacent side wall.

7. The cart as claimed in claim 6, wherein each slide rod has opposite forward and rear ends corresponding to said first and second positions, respectively, of said panel, each rod having a downwardly recessed portion at each end comprising an end stop for the respective hook portion engaging in said downwardly recessed portion.

8. The cart as claimed in claim 7, wherein each upper slide rod is longer than each lower slide rod, whereby the back support panel is inclined rearwardly in said second position.

9. The cart as claimed in claim 1, wherein the base has opposite forward and rear ends, and is inclined downwardly from its rear end to its forward end to permit nesting.

10. The cart as claimed in claim 9, wherein the base is generally rectangular in shape.

11. The cart as claimed in claim 10, wherein the base has a generally U-shaped peripheral support rod defining said rectangular shape, and a tray is rigidly secured to said rod to extend across said base.

12. A shopping cart, comprising:

a wheeled base having a rear end and a forward end;

a frame projecting upwardly from the rear end of the base, the frame having a handle for pushing the cart;

a basket having a rear end secured to the frame and projecting forwardly from the frame above the base, the basket having a longitudinal axis extending from the rear end towards the forward end of the base;

the basket having a rear wall, a front wall, spaced side walls, and a lower wall;

a back support panel supported in the basket in a generally upright orientation between the front and rear walls of the basket;

the front wall of the basket having a pair of leg openings;

at least one horizontally extending guide member in each side wall extending in a direction transverse to the front wall up to the front wall of the basket;

the back support panel having opposite ends slidably engaging the respective guide members for sliding movement of the entire panel in a longitudinal direction along the guide members back and forth between a first position lying against the front wall with substantially no space between the back support panel and front wall, and a second position spaced rearwardly from the front wall;

the guide members including end stops for releasably locking said back support panel in said first and second positions;

the back support panel in said first position forming a closure for the leg openings and in said second position being at a predetermined spacing from said front wall to form a back rest for a child seated on the lower wall with the child's legs extending out through the leg openings.

* * * * *